J. M. WILLIAMS.
Cultivator.
No. 28,929.
Patented June 26, 1860.
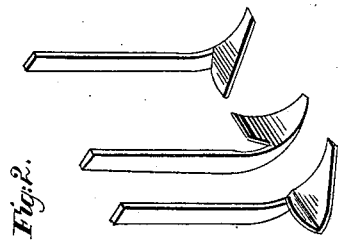
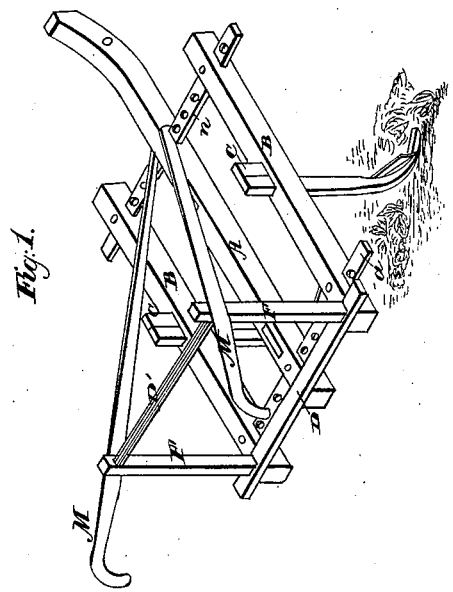
Inventor:
John M. Williams
Witnesses:
Wm. M. Arnace
C. M. Alexander

UNITED STATES PATENT OFFICE.

JOHN M. WILLIAMS, OF GREENVILLE, GEORGIA.

IMPROVEMENT IN CULTIVATORS.

Specification forming part of Letters Patent No. 28,929, dated June 26, 1860.

*To all whom it may concern:*

Be it known that I, JNO. M. WILLIAMS, of Greenville, in the county of Meriwether and State of Georgia, have invented certain new and useful Improvements in Cultivators; and I do hereby declare that the following is a full, clear, and exact description of the same, reference being had to the accompanying drawings, and to the letters of reference marked thereon.

The nature of my invention consists in constructing and arranging the several parts of this cultivator in the manner hereinafter described.

In the annexed drawings, Figure 1 represents a perspective view of the cultivator complete for working cotton. Fig. 2 represents several of the blades used.

In the figures, A represents the main beam of the cultivator. B B represent two collateral beams, which are situated on each side of the beam A. The beams A B B are each provided with two horizontal and two or more vertical mortises. Two bars, a a, graduated with holes, as represented at e e, pass through the corresponding horizontal mortises, and are about midway firmly secured in the mortise of the main beam A by means of screws or bolts or otherwise. The graduated ends of these bars play snugly in the mortises of the collateral beams, and are stationed in them at any desirable point by means of adjustable pins or bolts. By means of these bars sliding in the mortises the collateral beams may be brought nearer to or may be removed farther from the main beam, and there stationed, as may be desirable for different kinds of cultivation. The vertical mortises are for the purpose of receiving the shanks to which the plow-blades are attached, the shanks being secured in them by means of wedges c c, as represented in the drawings.

D represents a bar which is secured upon the rear of the beam A. The two ends of this bar project over the beams B B and rest upon them.

The two standards F F, which sustain the handles of the cultivator, rest upon this bar, being let into it near its ends.

The plow-handles are secured at their front ends to the beam A, as seen. The object of arranging the handles in this manner is that they may be stationary while the two collateral beams move to or from the beam A, and that while stationary they may rest upon a strong and firm basis. In raising and tipping or moving the cultivator it must be done by means of the handles, and it is necessary that they should be so arranged that this may be done without straining or racking them in their connection to the cultivator-frame.

This cultivator may be used for harrowing corn or cotton. In plowing or harrowing cotton the blades are used which are seen in Fig. 1. For corn other teeth or blades of a different shape may be used. For bedding for cotton the blades seen in Fig. 2 are used, with a shovel-plow between.

The different blades used in any plow and for any purpose may be used in any desired combination by removing the shanks in the beams and securing in those which it is desired to use.

Having thus fully described my invention, what I claim as new, and desire to secure by Letters Patent, is—

The arrangement of the beam A, the two collateral beams B B, the graduated bars a a, the handles M M, the supports F F, and the bar D, when said bar is secured to the main beam and rests upon the collateral beams, and when the several beams are provided with vertical and horizontal mortises for receiving the bars and shanks, as is herein fully set forth, and for the purpose specified.

JOHN M. WILLIAMS.

Witnesses:
C. M. ALEXANDER,
A. A. YEATMAN.